United States Patent [19]

Krause et al.

[11] Patent Number: 4,918,688

[45] Date of Patent: Apr. 17, 1990

[54] METHOD AND APPARATUS FOR COUPLING COMPUTER WORK STATIONS

[75] Inventors: Jeffrey J. Krause, Los Altos; George W. Harris, Jr., Mountain View; Richard A. Lagueux, Jr., San Jose; Luca Kafiero, Palo Alto; Maurilio T. DeNicolo, Mountain View; Mario Mazzolo, Campbell, all of Calif.

[73] Assignees: Convergent Technologies, Inc., San Jose; David Systems, Inc., Sunnyvale, both of Calif.

[21] Appl. No.: 925,444

[22] Filed: Oct. 31, 1986

[51] Int. Cl.[4] ............................................. H04J 1/14
[52] U.S. Cl. ........................................................ 370/76
[58] Field of Search ................ 370/76, 69.1, 125, 123, 370/95, 58

[56] References Cited

U.S. PATENT DOCUMENTS 4,302,629 11/1981 Foulkes et al. ..................... 370/123
4,646,289 2/1987 Tsiakas et al. ........................ 370/76

Primary Examiner—Robert L. Griffin
Assistant Examiner—Wellington Chin
Attorney, Agent, or Firm—Townsend and Townsend

[57] ABSTRACT

A method and apparatus for automatically and dynamically providing wiring connections at a central location coupled via ordinary phone lines to a plurality of work stations including a master work station. A central hub couples to a plurality of two wire telephone lines, each of which is coupled to an individual work station. The hub includes circuitry for monitoring transmissions to determine which of the work stations is the master. A receiver coupled to the master work station is coupled to transmitters to each of the other work stations. Receivers coupled to the remaining work stations are in turn coupled to a transmitter to the master work station.

23 Claims, 9 Drawing Sheets

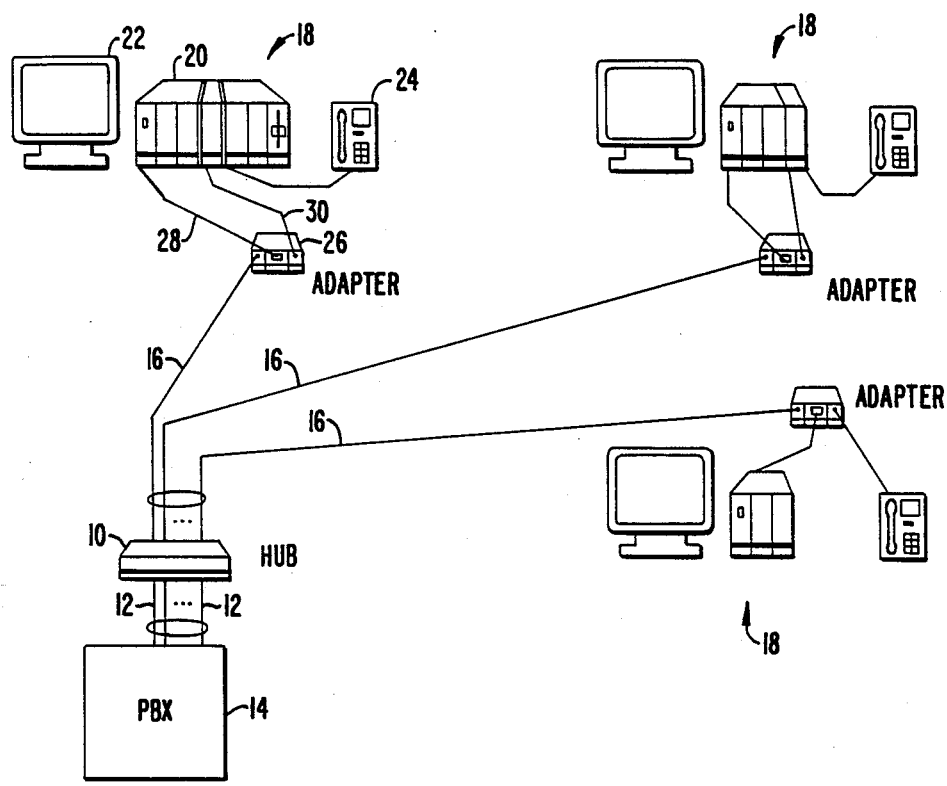
FIG._1.

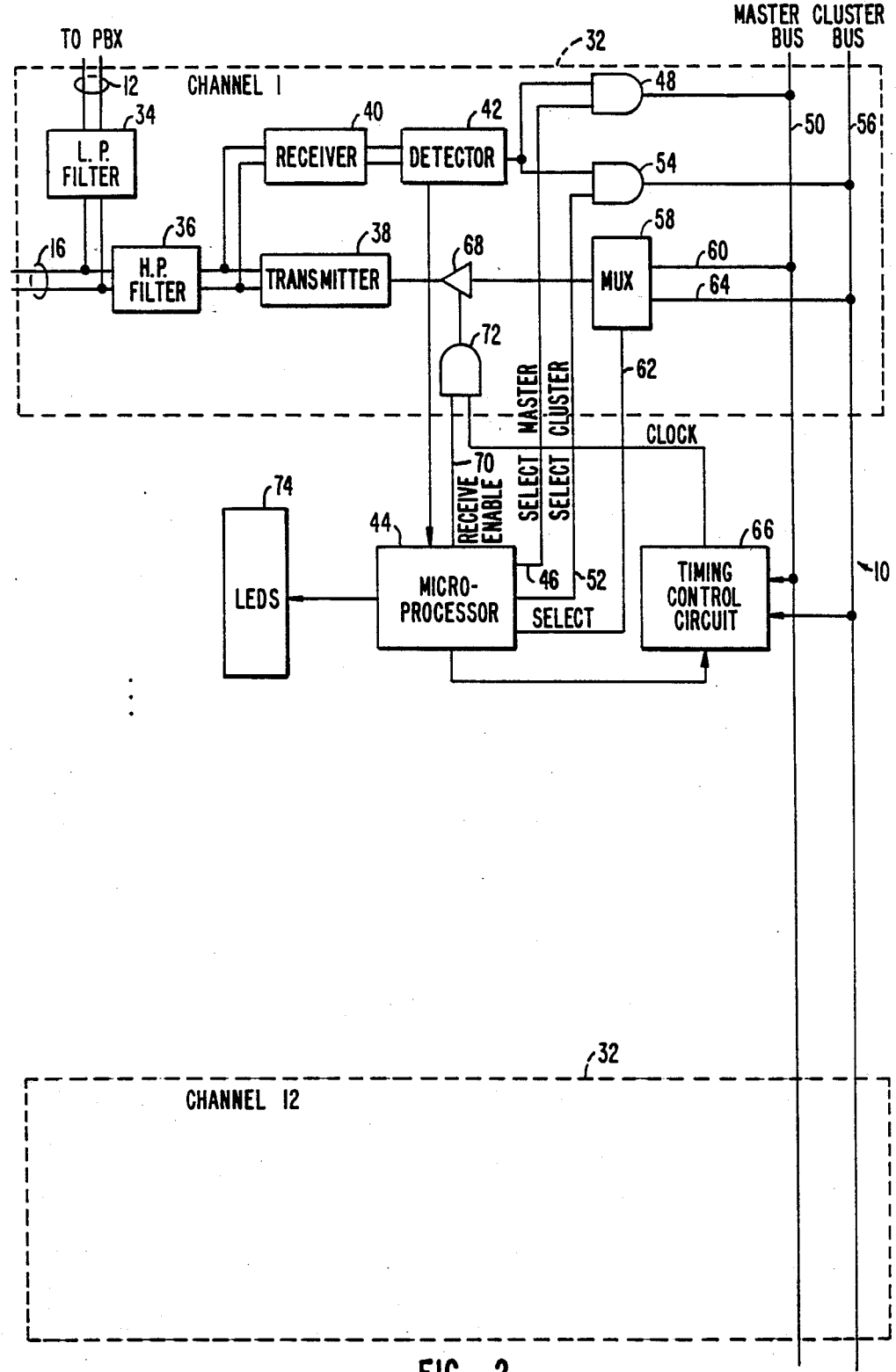
FIG._2.

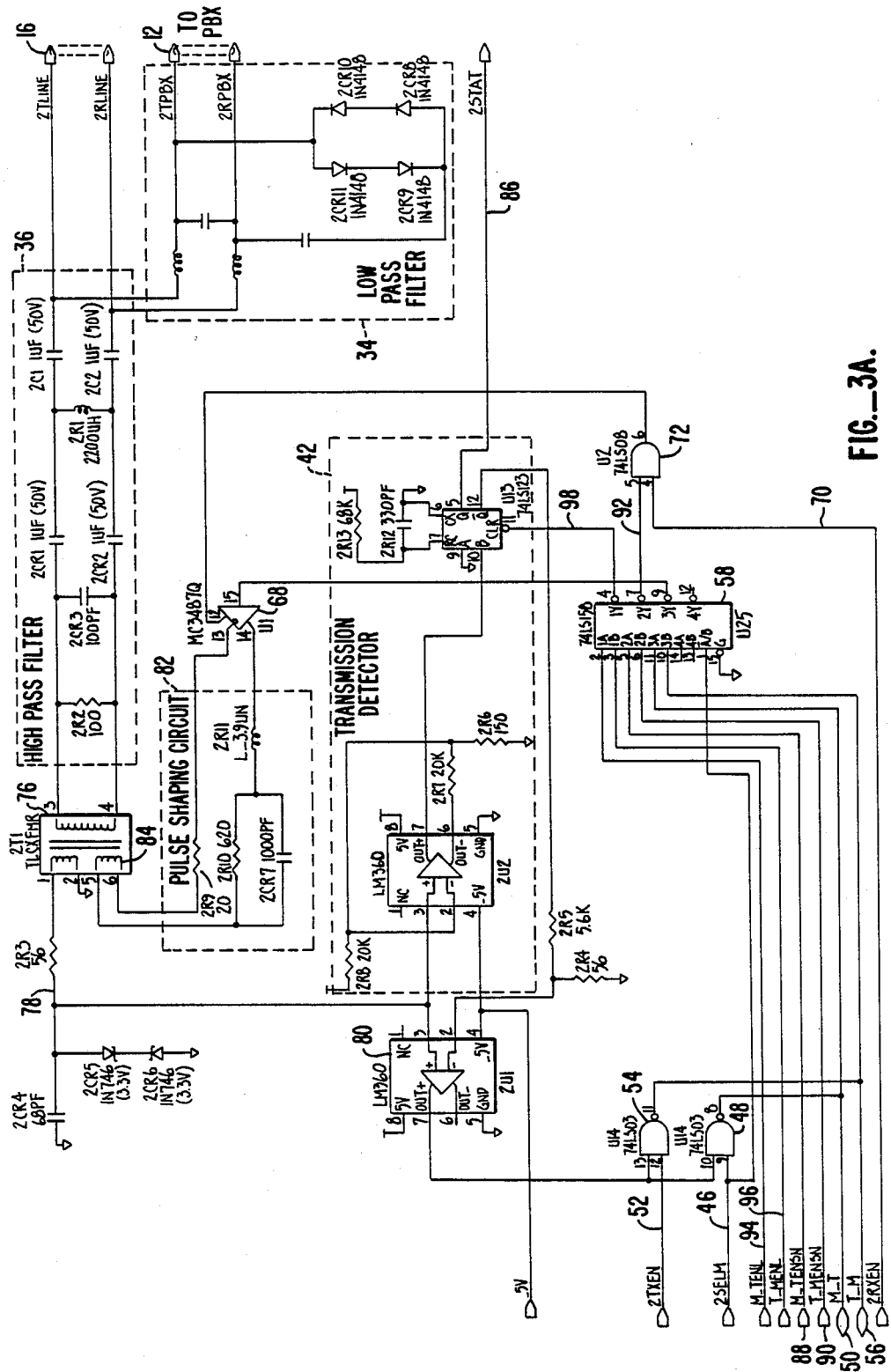
FIG._3A.

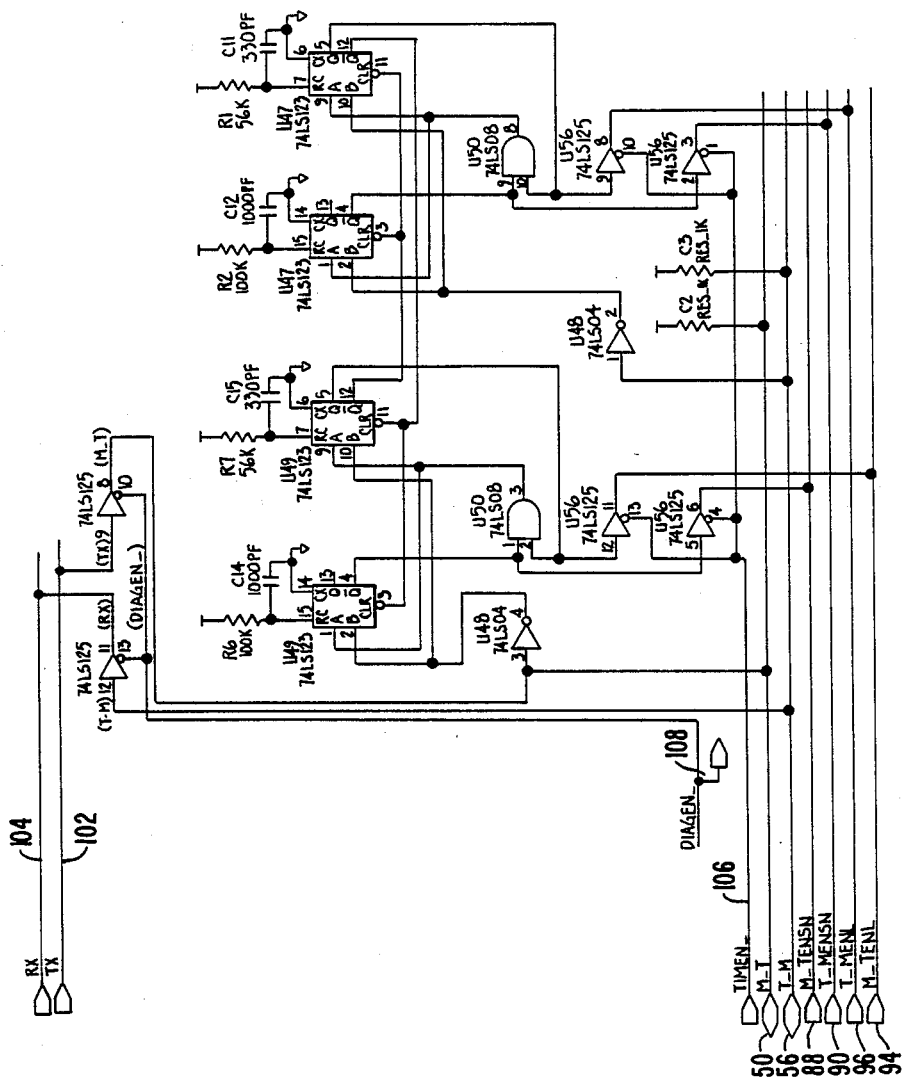
FIG.—3B.

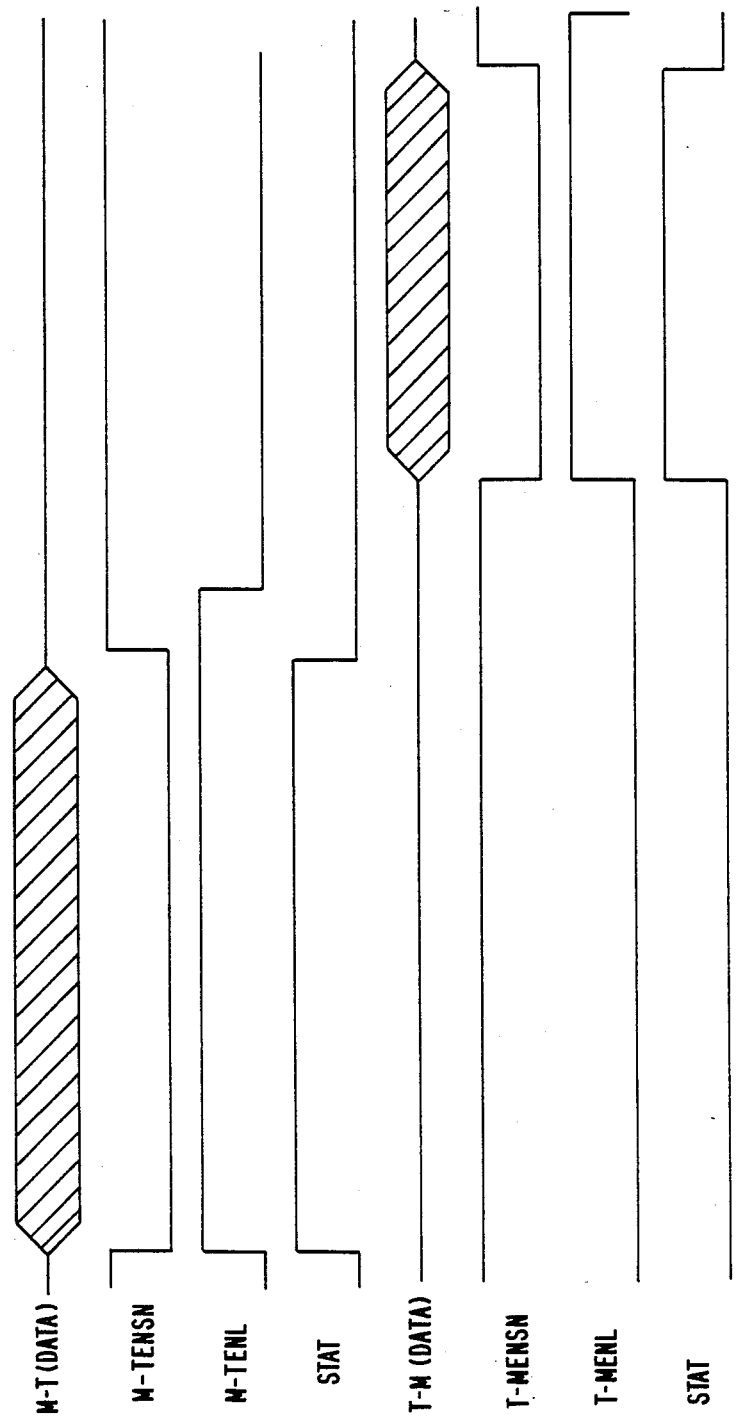
FIG._3C.

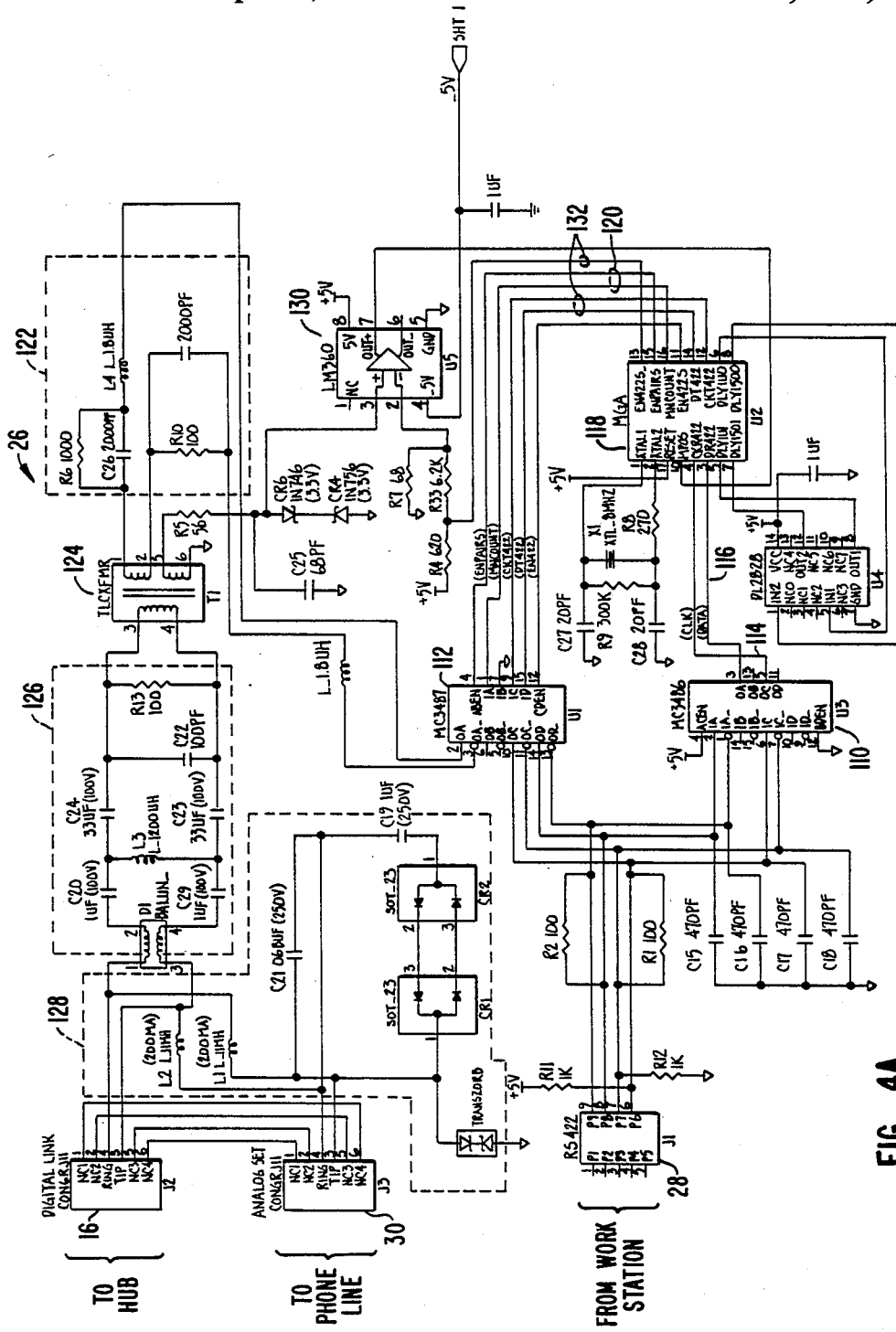
FIG._4A.

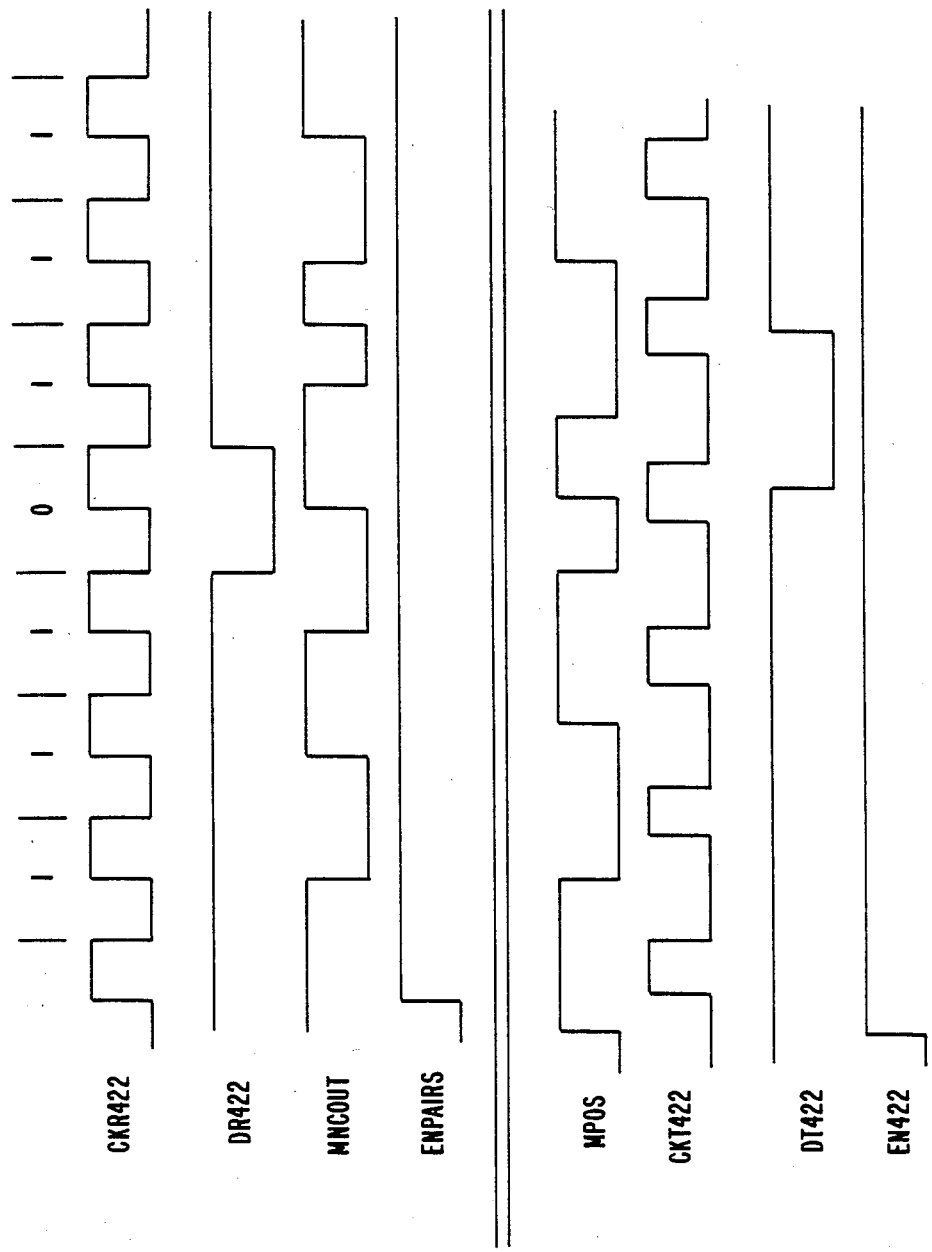
FIG._4B.

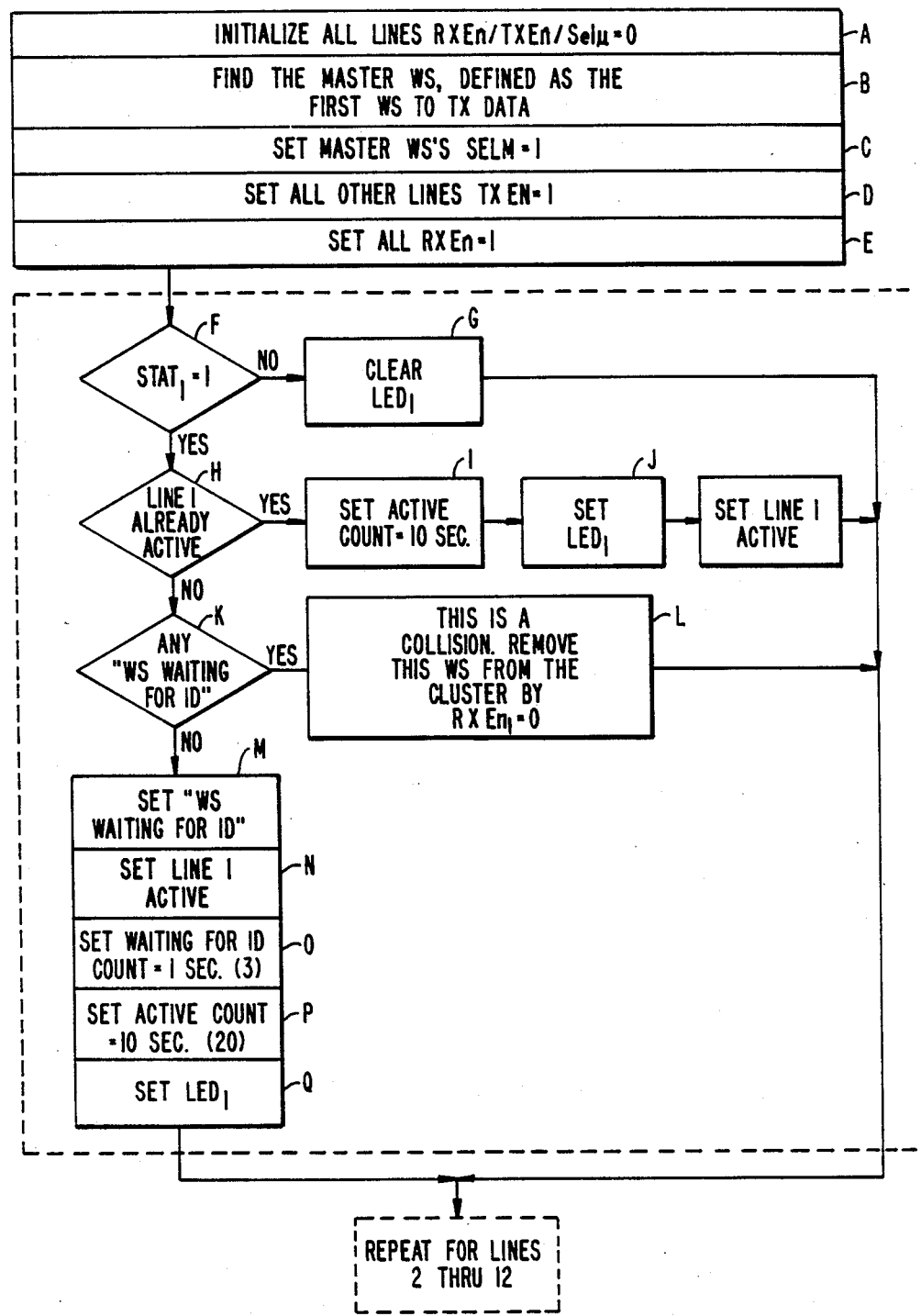
FIG._5A.

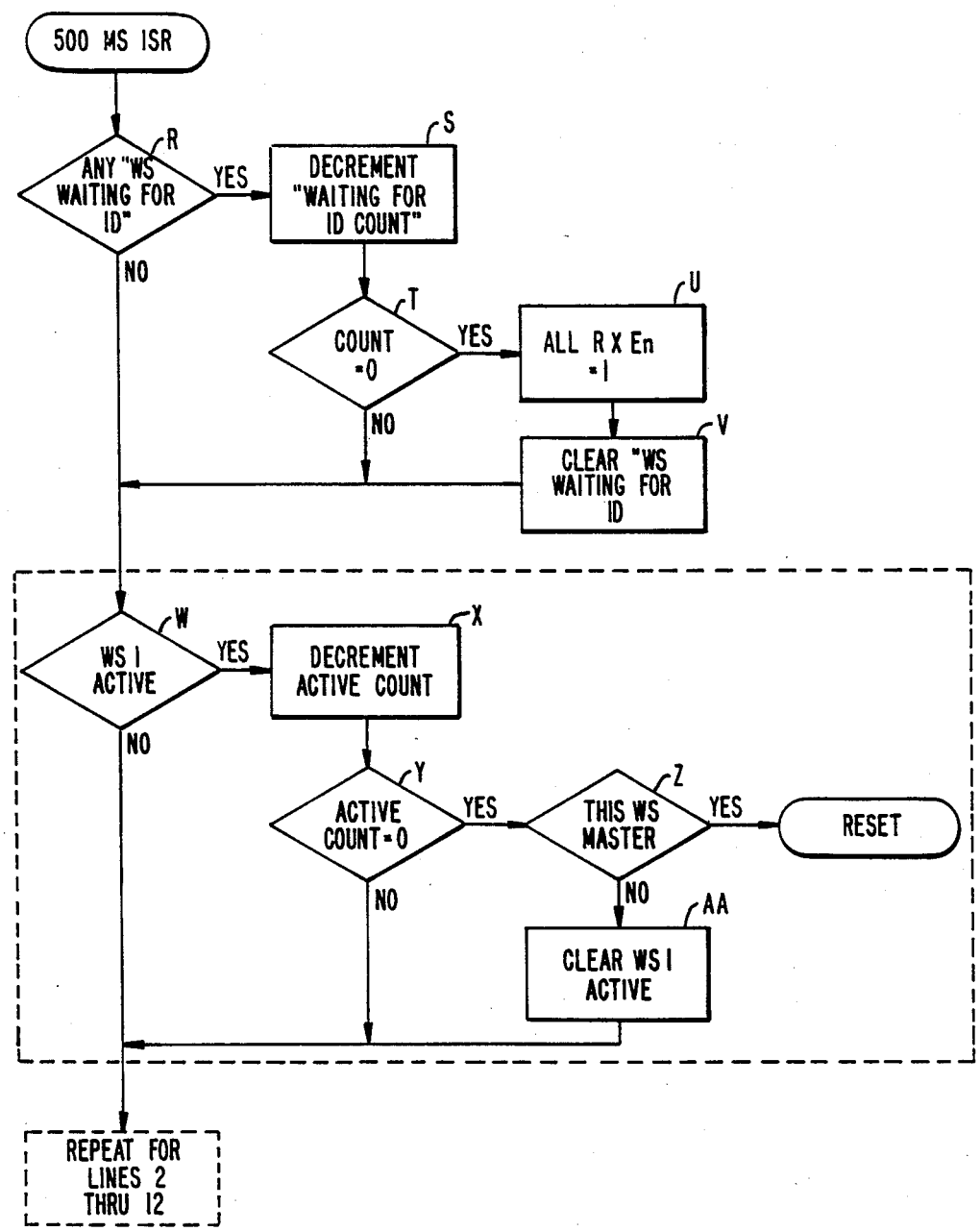
FIG._5B.

METHOD AND APPARATUS FOR COUPLING COMPUTER WORK STATIONS

BACKGROUND

The present invention relates to methods and apparatus for connecting work stations in a local area network using ordinary telephone lines.

In a local area network, a number of computer work stations are coupled together to provide a network of computers with increased power and capabilities over a single computer. These network systems typically use a multi-wire cable or a broadband coaxial cable capable of carrying multiple channels. This type of cabling allows high transmission speeds and the use of complex protocols to accommodate the high speeds. Some systems use ordinary two wire telephone lines but are correspondingly slower in operation.

Several different systems are in use for allowing multiple work stations to communicate along a single connecting cable. In the token-ring system, a code number (token) is passed around the network and each station can transmit only when it has possession of the token. Other systems utilize collision detection to determine if two stations have transmitted simultaneously, with each of the stations then retransmitting at a randomly different time to avoid another collision. Alternatively, a central control system can be coupled to each of the work stations in a star configuration to control the flow of data.

Due to the costs of installing special cables for computer work stations, it would be advantageous to be able to use existing phone lines within a building for coupling work stations together. Two major problems need to be solved to accomplish this. First, voice and data must be both accommodated on the same telephone line. Second, the various work stations must be coupled together at the central PBX for the phone lines in a manner compatible with the transmitting system of the work stations on broadband cable if existing work stations designed to operate on broadband cable are to be used. A further problem arises when a network system has a designated master terminal among the work stations with the remaining work stations being slave terminals. The wiring must be done in such a way that the master is properly connected to its appropriate input at a central routing system connected to the PBX. This wiring must be redone each time the master work station is moved from one phone outlet to another.

SUMMARY OF THE INVENTION

The present invention is a method and apparatus for automatically and dynamically providing wiring connections at a central location coupled via ordinary phone lines to a plurality of work stations including a master work station. A central hub couples to a plurality of two-wire telephone lines, each of which is coupled to an individual work station. The hub includes circuitry for monitoring transmissions to determine which of the work stations is the master. A receiver coupled to the master work station is coupled to transmitters from each of the other work stations. Receivers coupled to the remaining work stations are in turn coupled to a transmitter from the master work station.

In the preferred embodiment, each of the work stations is designed for use with a broadband or multi-wire cable system and includes an adapter for coupling the broadband or multi-wire system to an ordinary two wire telephone line. The hub includes high-pass and low-pass filters coupled to each of the telephone lines for separating voice from data. The voice information is routed to a PBX. The hub includes a receiver and transmitter coupled to each of the telephone line inputs. The receivers for all of the cluster (non-master) work stations are coupled to a first internal bus which is also coupled to the transmitter for the master work station. Conversely, the receiver for the master work station is coupled to a second internal bus which is coupled to the transmitters for each of the cluster work stations. Accordingly, the master work station can communicate to all of the cluster stations while each of the cluster stations can also communicate to the master.

The identity of the master work station is determined by monitoring transmissions after power is first supplied to the system. The first work station initiating transmissions is presumed to be the master work station. A set of enable signals are then generated to connect the individual receivers and transmitters as discussed above.

The present system preferably operates on a cluster work station system in which a master station, upon power being applied, sends out an identification signal (ID number) to all of the cluster work stations. Each of the cluster work stations sends back a response to the ID number at a randomly different period of time after receiving the ID number. The first work station to reply is assigned that ID number. This procedure repeats itself until all of the cluster work stations have been assigned ID numbers. Thereafter, the master work station can designate the cluster work station to which it is communicating by using the appropriate ID number. A cluster work station can identify itself to the master station by using the ID number as well. A collision detection scheme is utilized in the event of two cluster work stations responding simultaneously.

The hub configuration of the present invention allows collision detection to be done more efficiently. Detector circuitry in the hub monitors the transmissions of the cluster work stations and if more than one cluster attempts to transmit at the same time, all but first colliding work station transmitters at the hub are disabled for 1.25±0.25 sec. This prevents the colliding work station from receiving transmissions from the master and being assigned the same ID number as another work station.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of a network system using the present invention;

FIG. 2 is a block diagram of the hub of FIG. 1;

FIG. 3A is a schematic diagram of the circuitry of a work station channel in the hub of FIG. 2;

FIG. 3B is a schematic diagram of the timing control circuit of the hub of FIG. 2;

FIG. 3C is a timing diagram for the circuit of FIG. 3B;

FIG. 4A is a schematic diagram of an adapter of FIG. 1;

FIG. 4B is a timing diagram for the encoding/decoding gate array of FIG. 4A; and FIGS. 5A and 5B are a flowchart of the collision detection software of the microprocessor of FIG. 2.

DETAILED DESCRIPTION OF THE PREFERRED EMBODIMENTS

FIG. 1 shows a hub 10 which is coupled via a plurality of phone lines 12 to a PBX 14. Hub 10 is also coupled via a plurality of phone lines 16 to a number of work stations 18. Each work station 18 has a series of computer modules 20, a monitor 22 and a telephone 24. An adapter 26 couples a multi-wire cable 28 to phone line 16 as well as coupling a two-wire telephone line from telephone 24 or one of the modules 20 via phone line 30 to adapter 26. This system allows a number of work stations 18 to be coupled together using already installed phone lines 16 by simply using a plurality of adapters 26 and inserting a hub 10 adjacent an existing PBX for the telephones. The adapters do the encoding/decoding between the multiwire cable and the phone line while the hub does the routing of signals.

Hub 10 of FIG. 1 is shown in block diagram form in FIG. 2. Hub 10 includes 12 channel circuits 32, one for each of the work stations. Each channel is coupled to a two-wire phone line 16 as shown in FIG. 1. Phone line 16 couples to a low-pass filter 34 and a high-pass filter 36. Low-pass filter 34 passes the voice communications from the telephone to a two-wire telephone line 12 which is connected to PBX 14 as shown in FIG. 1. High-pass filter 36 passes the high frequency digital computer data while preventing the low frequency voice data from passing. High-pass filter 36 is coupled to a transmitter 38 and a receiver 40. A detector 42 coupled to receiver 40 monitors the line to detect a transmission. When a transmission is detected, a signal is provided to a microprocessor 44.

Each channel has circuitry to configure it as a master channel or as a cluster channel. The master channel routes outgoing signals to the cluster channels and incoming signals from the cluster channels to the master work station, while the cluster channels do an opposite routing. Upon start up, the first work station to transmit is determined to be the master and a high level select master signal from microprocessor 44 is sent on a line 46 to an AND gate 48 to enable signals received from that work station to be coupled to a master bus 50. The remaining work stations receive an enable signal on a line 52 to an AND gate 54 to couple transmissions received from that work station to a cluster bus 56. The work station channels 32 are thus divided into a master work station channel and a number of cluster work station channels. Each cluster work station channel has a multiplexer 58 which can couple an input line 60 to master bus 50. Input line 60 is selected by a signal on a control line 62 from microprocessor 44. Thus, transmission signals received from the master are transmitted to the remaining cluster stations. Conversely, the master work station channel multiplexer 58 has an input 64 coupled to cluster bus 56 by a signal on control line 62. Thus, transmissions received from the various cluster work stations are sent along bus 56 to line 64, through multiplexer 58 and through transmitter 38 to the master work station.

A timing control circuit 66 produces timing signals from the data appearing on master bus 50 and cluster bus 56. These timing signals are provided to an enable input for a gate 68 which controls the transmitted data to each channel. Timing control circuit 66 thus clocks the data based on inputs from the data itself and thus functions, in conjunction with each channel, as a repeater circuit. A receive enable signal line 70 is ANDed with the clock from timing control circuit 66 in an AND gate 72. This enables microprocessor 44 to disable a particular channel in the event of a detected collision. Microprocessor 44 also controls the illumination of a bank of LEDs 74. An LED is provided for each channel, with the LED being lit each time a transmission is detected to provide a diagnostic tool.

FIG. 3A shows the circuitry of a channel 32 in more detail. As noted above with reference to FIG. 2, the input telephone line 16 is coupled to high-pass filter 36 and low-pass filter 34. Low-pass filter 34 passes the signal to the PBX through telephone lines 12. On the receiver side, a transformer 76 provides a received signal through a secondary winding to a line 78, which is coupled to a buffer 80, which then provides the signal to AND gates 48 and 54. This signal is then coupled to either bus 50 or bus 56 as discussed with reference to FIG. 2. Transmission detector 42 provides a signal on a line 86 to the microprocessor when transmission is detected on line 78.

On the transmission side, one of buses 50 and 56 is coupled through multiplexer 58 to a gate 68 which is coupled to a pulse-shaping circuit 82. The output of pulse-shaping circuit 82 is provided to a secondary winding 84 of transformer 76. The transmitted signal is then provided to telephone line 16 through high pass filter 36.

Multiplexer 58 also selects one of lines 88 and 90 to provide a timing signal to AND gate 72 on line 92. In addition, one of lines 94 and 96 is selected to provide a timing signal on line 98 to transmission detector 42. The clock signal on line 92 is generated either from the master bus 50 or the cluster bus 56 depending on which bus is selected for the particular channel. Similarly, a clearing signal on line 98 to transmission detector 42 clears a flip-flop in transmission detector 42 to disable the channel status signal to prevent a transmitted signal from erroneously being detected as a received signal.

The timing signals are generated by central timing circuit 66 shown in more detail in FIG. 3B. In addition to the signal lines already discussed, the timing control circuit is coupled to transmit (TX) and receive (RX) signals on lines 100 and 102, respectively, from microprocessor 44. The RX and TX signals are also coupled to a port to enable the interconnecting of two 12 cluster boards. Upon initialization, when one board detects a master it sends a signal to the other board. The other board will become all cluster work stations unless it signals back that it has a master also, in which case two 12 work station hubs are formed instead of a 24 work station hub. In addition, a timing enable signal is provided on a line 106 and a diagnostic line 108 is provided.

A timing diagram for timing circuit 66 is shown in FIG. 3C. Because the microprocessor is not fast enough to respond to a detected data frame, the timing circuit of FIG. 3B is used. When data is detected (either M-T or T-M), control signals are immediately generated to configure the channels as discussed below. Two one-shots are needed for each type of data since different length pulses are needed. The M-TENL and T-MENL signals are longer than the M-TENSN and T-MENSN signals, respectively, to provide a safety margin by disabling channels for a period longer than the data frame.

FIG. 4A is a schematic diagram of adapter 26 of FIG. 1. An RS422 cable connection 28 is coupled to an RS422 receiver 110 and an RS422 driver 112. Transmissions from the work station to the hub occur as follows.

Receiver 110 provides clock and data signals from the RS422 cable on a pair of lines 114 and 116, respectively, to a gate array 118. Gate array 118 performs the appropriate translation to combine the data and the clock on signal lines 120, which are provided through driver 112 to a pulse-shaping circuit 122. The output of pulse-shaping circuit 122 is provided through a transformer 124 and a high-pass filter 126 to phone line connection 16. Phone line 16 is provided to central hub 10 as shown in FIG. 1. A phone line input 30 from a telephone set is provided through a low-pass filter 128 to telephone lines 16.

The gate array (118) operates as a differential manchester encoder/decoder and also handles the two data rates which may be used in the cluster system. A timing diagram for gate array 118 is shown in FIG. 4B. Separate clock (CKR422) and data (DR422) inputs are manchester encoded and the output (MNCOUT) is connected to driver 112. In addition, signal EN422SN during this time is active to enable the driver 112. In the decoding process, the manchester encoded signal (MPOS) from receiver 130 is sensed by the decoder and signal EN422SN is enabled. The gate array determines the system data rate, (307 Kbps or 1.8 Mbps), and employs either a one microsecond delay (for 307 Kbps) or one hundred sixty nanosecond delay (for 1.8 Mbps) in the decoding process. Upon detection of the first transition at MPOS, the decoder waits one delay time 1μs or 160 ns). After the delay the decoder sets a window equal to the delay time. If a transition occurs during this window, a zero is decoded and if no transition occurs, a one is decoded. The decoded data (DT422) and clock (CKT422) outputs are connected to receiver 112.

Transmissions from the hub across phone line 16 are provided to RS422 port 28 as follows. The signals on lines 16 are provided through high-pass filter 126 to transformer 124. The signal on transformer 124 is picked-up and provided to a high speed comparator 130 which provides the signal to gate array 118. Gate array 118 serves to disassemble the combined clock and data to provide the clock and data on separate lines again. This clock and data is provided on a pair of lines 132 to RS422 driver 112 and through driver 112 to port 28.

Receiver 110 and driver 112 have tri-state outputs so that the signals only travel in the desired direction. Receiver 110 translates the differential signal from RS422 cable 28 to an unbalanced signal which is provided to gate array 118. Comparator 130 serves to square up and clean up the data received from the hub before providing it to gate array 118. Low-pass filter 128 prevents data signals from being provided to a telephone coupled on line 30, while high-pass filter 126 prevents voice signals from being communicated through transformer 124 to the data communications circuitry.

FIGS. 5A and 5B show a flowchart for the operation of microprocessor 44 of FIG. 2. Upon start up, the program first initializes all lines (step A). The master work station is then found by monitoring the status line 86 provided by each channel to determine which channel is the first to transmit data. The first channel to transmit data will be the master work station (step B). The select master line 46 for the master work station channel is then set to one (step C). For all of the other channels, enable line 52 is set to one (step D). Finally, receive enable line 70 is set to one for all channels (step E).

The status line 86 for each of the channels is then monitored. As each status line is looked at, it is determined whether it has a digital one value (step F). If the status line does not equal one, the LED for that channel is cleared so that it will be off (step G). If the status line is active, the program determines whether that line has previously been indicated as active (step H). If the line has previously been active, an active count is set for 10 seconds (step I). A particular channel must be detected as being active for at least 10 seconds, otherwise the detected transmission is deemed to be spurious and ignored. After the active count is set, the LED for that channel is activated (step J).

If the line was not previously active, the program determines whether any other work station is active (i.e., waiting for an ID from the master work station) (step K). If another work station is active and waiting for an I.D., this is determined to be a collision. The new active work station is disabled from receiving a reply from the master work station by setting its receive enable line 70 to zero (step L). If no other work station is waiting for an ID, a work station waiting for ID flag is set (step M). A line active flag is also set (step N). A waiting for ID count is set to 3 and an active count is set to 20 (corresponding to 10 seconds) (steps O and P). Finally, an LED for that channel is activated (step Q).

Steps F-Q are repeated for each of the 12 channels. The program will run through all 12 channels in approximately 75 microseconds (worst case).

Every 500 milliseconds, an interrupt subroutine is run as shown in FIG. 5B. The subroutine first determines whether any work station is waiting for an ID (step R). If a work station is waiting for an ID, the waiting for ID count is decremented (step S). If the count equals zero (step T), then the work station has been waiting for an ID for three interrupt routines (approximately 1-1.5 seconds). If the count is zero, the receive lines 70 for all of the channels are set to one (step U) and the work station waiting for ID flag is cleared (step V). Since the work station has been waiting for an ID for at least one second, the program assumes that the ID has been assigned in this time and that further transmissions on that channel are the transferred data.

If the count is not zero, the program continues on to determine whether the work stations are active. If a work station is active (step W), the active count is decremented (step X) and is examined to determine if the active count is zero (step Y). If the count is zero, the program determines whether this is the master work station (step Z). If it is the master work station, the program goes through a reset mode and starts at step A again on the assumption that the system has been turned off. If it is not the master work station, the work station active flag is cleared (step AA). The process is then repeated for each of the other 12 channels and then the program returns from the subroutine.

As will be understood by those familiar with the art, the present invention may be embodied in other specific forms without departing from the spirit or essential characteristics thereof. For example, the work stations could be coupled directly to a two-wire telephone line, or a cable using a standard other than RS422 could be used. Accordingly, the disclosure of the preferred embodiments of the invention is intended to be illustrative, but not limiting, of the scope of the invention which is set forth in the following claims.

What we claim is:

1. An apparatus for coupling a plurality of cluster work stations to a master work station over two-wire telephone lines at a central hub, each of said two-wire telephone lines having a first end connected to one of said cluster and master work stations and a second end connected to said hub, comprising:
   means in said hub for determining which of said two-wire telephone lines is coupled to said master work station, wherein said first end of any of said two-wire telephone lines could be coupled to said master work station and said master and cluster work stations can be reconfigured to couple said master work station to said first end of a different one of said two-wire telephone lines;
   means in said hub for providing transmissions received from said second end of said two-wire telephone line connected to said master work station to said second end of said two-wire telephone lines connected to all of said cluster work stations; and
   means in said hub for providing transmissions received from said second end of said two-wire telephone lines connected to said cluster work stations only to said second end of said two-wire telephone line connected to said master work station.

2. The apparatus of claim 1 further comprising an adapter coupled to each said work station for converting a greater than two-wire line from said work station to one of said two-wire telephone lines.

3. The apparatus of claim 1 further comprising means for separating voice from data on said telephone lines.

4. The apparatus of claim 3 wherein said means for separating voice and data comprises a high-pass filter coupled at an input to said hub and a low-pass filter coupled between said input and an output to a telephone exchange.

5. The apparatus of claim 4 further comprising an adapter at said work station for converting a greater than two-wire line from said work station to one of said two-wire telephone lines, said adapter having a high-pass filter coupling said input from said hub to said adapter and a low-pass filter coupling said input to an optional telephone.

6. The apparatus of claim 5 wherein said adapter further comprises:
   a transformer having a primary winding coupled to said high pass filter and first and second secondary windings;
   a comparator having an input coupled to said first secondary winding;
   means, coupled to an output of said comparator, for separating a clock signal from a data signal from said comparator output and providing separate clock and data outputs;
   an RS422 driver having inputs coupled to said clock and data outputs of said comparator and having outputs coupled to a RS422 connector;
   an RS422 receiver having inputs coupled to said RS422 port; and
   means, coupled to outputs of said RS422 receiver, for combining separate clock and data signals from said RS422 receiver onto a differential pair of output lines, said output lines being coupled to said second secondary winding of said transformer.

7. The apparatus of claim 1 wherein said means for determining comprises a detector for monitoring a first transmission on said two-wire telephone lines.

8. The apparatus of claim 1 wherein said means for providing transmissions from said master work station to all of said cluster work stations comprises a receiver coupled to one of said two-wire telephone lines connected to said master work station, means for coupling said receiver to a master bus, a plurality of transmitters coupled to said two-wire telephone lines to each of said cluster work stations, and a plurality of means for coupling said master bus to said transmitters, such that transmissions from each cluster work station to said master work station travel through one of said two-wire telephone lines, one of said transmitters, said master bus, said means for coupling and said receiver.

9. A hub for coupling a plurality of cluster terminals to a master terminal over two-wire lines, comprising:
   a plurality of channels coupled to said terminal, each channel having a transmitter and a receiver;
   a master bus coupled to all of said channels;
   a cluster bus coupled to all of said channels;
   means for determining which of said channels is coupled to said master terminal;
   means for coupling the transmitter in the channel coupled to said master work station to said master bus and the transmitters in the remaining channels to said cluster bus; and
   means for coupling the receiver in said channel coupled to said master work station to said cluster bus and said receivers in said remaining channels to said master bus.

10. The hub of claim 9 wherein said means for determining which of said channels is coupled to said master terminal comprises means for monitoring transmissions on said buses after power is supplied to said hub, the channel having the first transmission after power is supplied being the master channel.

11. The hub of claim 10 wherein said means for monitoring comprises a plurality of detectors, each detector being coupled to one of said channels, and a microprocessor coupled to each of said detectors.

12. The hub of claim 9 wherein each said means for coupling each said transmitter comprises a multiplexing circuit coupling said master and cluster buses to each said transmitter in each of said channels and a microprocessor coupled to at least one select input of each said multiplexing circuit.

13. The hub of claim 9 wherein each said means for coupling each said receiver comprises a demultiplexing circuit coupling each said receiver to said master and cluster buses in each of said channels and a microprocessor coupled to at least one select input of each said demultiplexing circuit.

14. The hub of claim 13 wherein each said demultiplexing circuit comprises first and second AND gates.

15. The hub of claim 9 wherein said master terminal includes means for initiating a transmission upon the application of power to said master terminal; and
   each cluster terminal includes means for initiating an acknowledgement transmission after both power is applied and receipt of a transmission from said master terminal.

16. The hub of claim 15 wherein said master terminal includes means for transmitting an ID number to a cluster terminal in response to said acknowledgement transmission.

17. The hub of claim 9 further comprising a timing control circuit coupled to said master bus and to said cluster bus, said timing control circuit including means for enabling a connection between one of said buses and at least one of said transmitters in response to a data transmission on said one of said buses.

18. The hub of claim 9 wherein each said transmitter and receiver includes means for transmitting and receiving data on said buses in baseband format.

19. The hub of claim 18 wherein said baseband format is manchester encoded.

20. The hub of claim 9 further comprising a pulse shaping circuit in each of said channels coupled to said receiver.

21. The hub of claim 9 further comprising a plurality of adapter circuits for coupling said terminals to said channels, each adapter circuit including:
- a terminal receiver coupled to said terminal with at least separate clock and data lines;
- a translation circuit coupled to said terminal receiver for combining clock and data signals from said clock and data lines onto a differential pair of output lines;
- a pulse shaping circuit having an input coupled to said differential pair of output lines; and
- means for coupling an output of said pulse shaping circuit to one of said two-wire lines coupled to said channel.

22. A hub for coupling a plurality of cluster work stations to a master work station over two-wire telephone lines, comprising:
- a microprocessor for controlling the operation of said hub;
- a timing circuit for providing clock signals in said hub; and
- a plurality of channels corresponding to said work stations, each channel including
  - a high pass filter adapted to couple at a first end to a telephone line to one of said work stations,
  - a low pass filter having a first end coupled to said telephone line and a second end adapted to couple to an external telephone exchange,
  - a transformer having a primary winding and first and second secondary windings, said primary winding being coupled to a second end of said high pass filter,
  - a detector having an input coupled to said first secondary winding,
  - a master bus, said master bus being coupled to all of said channels,
  - a cluster bus, said cluster bus being coupled to all of said channels,
  - a first gate for coupling said detector to said master bus, said first gate having an enable input coupled to said microprocessor,
  - a second gate for coupling said detector to said cluster bus, said second gate having an enable input coupled to said microprocessor,
  - a multiplexer having first and second inputs coupled to said master bus and said cluster bus, respectively, said multiplexer having a select input coupled to said microprocessor for selecting one of said first and second inputs for coupling to a multiplexer output, and
  - a third gate for coupling said multiplexer output to said second secondary winding of said transformer, said third gate having an enable input coupled to said microprocessor.

23. A method for avoiding collisions between transmissions from said plurality of cluster work stations to said master work station in the system of claim 1 using a controller, comprising:
- sequentially monitoring transmissions of said work stations on said two-wire telephone lines;
- determining a first work station in sequence to begin transmission with said means for determining;
- setting a first flag with said controller to identify any other work stations beginning transmissions within a first predetermined period of time from a time said first work station is determined to be transmitting, said other work stations being colliding work stations;
- disabling transmissions from said master work station to said colliding work stations with said means for providing transmissions from said master work station to all of said cluster work stations;
- enabling transmissions from said master work station to said colliding work stations after said first predetermined period of time with said means for providing transmissions from said master work station to all of said cluster work stations; and
- removing said first flag with said controller for any work station not transmitting for a second predetermined period of time.

* * * * *